US012796681B2

(12) United States Patent
Shanbhag et al.

(10) Patent No.: US 12,796,681 B2
(45) Date of Patent: Nov. 17, 2026

(54) REFRIGERATION DEVICE

(71) Applicant: Blackfrog Technologies Private Limited, Karnataka (IN)

(72) Inventors: Arun Shanbhag, Maharashtra (IN); Mayur U. Shetty, Karnataka (IN); Donson D Souza, Karnataka (IN); Sharad Anchan, Karnataka (IN)

(73) Assignee: Blackfrog Technologies Private Limited, Karnataka (IN)

( * ) Notice: Subject to any disclaimer, the term of this patent is extended or adjusted under 35 U.S.C. 154(b) by 9 days.

(21) Appl. No.: 17/600,686

(22) PCT Filed: Mar. 17, 2020

(86) PCT No.: PCT/IB2020/052415
§ 371 (c)(1),
(2) Date: Oct. 1, 2021

(87) PCT Pub. No.: WO2020/201868
PCT Pub. Date: Oct. 8, 2020

(65) Prior Publication Data

US 2022/0159946 A1 May 26, 2022

(30) Foreign Application Priority Data

Apr. 1, 2019 (IN) ............................ 201941013056

(51) Int. Cl.
*A01N 1/144* (2025.01)
*A61J 1/16* (2023.01)
(Continued)

(52) U.S. Cl.
CPC .............. *A01N 1/144* (2025.01); *A61J 1/165* (2013.01); *F25B 21/02* (2013.01); *F25D 29/003* (2013.01);
(Continued)

(58) Field of Classification Search
CPC ............. F25D 2201/14; F25D 2400/12; F25D 2700/02; F25D 2700/06; A61J 2200/72
See application file for complete search history.

(56) References Cited

U.S. PATENT DOCUMENTS

2002/0104318 A1* 8/2002 Jaafar ..................... A61J 1/165 62/235.1
2008/0178623 A1* 7/2008 Cunningham ........ F25D 31/007 224/483

(Continued)

FOREIGN PATENT DOCUMENTS

GB 2515514 A * 12/2014 ........... F25D 31/007
JP H0961038 A * 8/2018 .............. F25B 21/02

(Continued)

OTHER PUBLICATIONS

Translation KR-101889069-B1 (Year: 2018).*
JP-H0961038-A Translation (Year: 2018).*

*Primary Examiner* — David J Teitelbaum
(74) *Attorney, Agent, or Firm* — UB Greensfelder LLP; Benjamin D. Rotman

(57) ABSTRACT

Disclosed is a refrigerating device that includes: a refrigeration mechanism; and a cooling chamber. The cooling chamber is operatively coupled to the refrigeration mechanism using any or a combination of a latching mechanism and a screwing mechanism, and is configured to hold a load to be cooled. The refrigeration mechanism can be a thermoelectric assembly (TEA) and the device can include a proportional integral derivative (PID) controller to set and regulate temperature inside the cooling chamber. The cooling chamber can be a vacuum flask, open end of the vacuum flask configured to be thermally sealed with the TEA. The vacuum flask provides thermal insulation between the load and ambient environment. In an exemplary embodiment, the vacuum flask can be thermally sealed with the TEA by
(Continued)

configuring the TEA in a collar of thermal insulation, the collar configured to hold the vacuum flask by means of threads configured on the collar and the vacuum flask.

15 Claims, 8 Drawing Sheets

(51) Int. Cl.
*F25B 21/02* (2006.01)
*F25D 29/00* (2006.01)
*F25D 31/00* (2006.01)

(52) U.S. Cl.
CPC ......... *F25D 31/006* (2013.01); *A61J 2200/44* (2013.01); *A61J 2200/72* (2013.01); *F25D 2201/14* (2013.01); *F25D 2400/12* (2013.01); *F25D 2700/02* (2013.01); *F25D 2700/06* (2013.01)

(56) References Cited

U.S. PATENT DOCUMENTS

2009/0049845 A1* 2/2009 McStravick .......... A61M 5/003 62/3.62
2013/0098908 A1* 4/2013 Rances ................ B65D 21/083 220/529
2016/0262979 A1* 9/2016 Wengreen ............. A61M 5/002
2018/0335247 A1* 11/2018 Huisman ................ F25D 23/06
2019/0145688 A1* 5/2019 Tsuno ....................... F25D 3/06 62/129
2019/0195547 A1* 6/2019 Moon ....................... F17C 9/00
2019/0323756 A1* 10/2019 Alexander ............. F25B 21/02

FOREIGN PATENT DOCUMENTS

KR 20150120273 A 10/2015
KR 101889069 B1 * 8/2018
WO 2017208347 A1 12/2017
WO 2018087574 A1 5/2018

* cited by examiner

| SLNO | PART | DESCRIPTION |
|---|---|---|
| | | |
| 1 | HEAD CAP | Non-metallic body which houses the TEA and insulation around it. |
| 2 | HANDLE | To lift and move the setup |
| 3 | THERMO-ELECTRIC ASSEMBLY (TEA) | Solid-State heat-pump unit (Peltier based) |
| 4 | POLYURETHANE FOAM | Expandable foam insulation material |
| 5 | FLASK | Vacuum insulated Container |
| 6 | ACRYLIC/POLYPROPYLINE VIAL HOLDER | To hold the vials safely and in position |
| 7 | VIAL TRAY | Compartment inside the holder |
| 8 | VIALS | Vials consists of vaccines or other temperature-sensitive materials. |
| 9 | VIAL HOLDER DOOR | Door for the user to access the vaccine |
| 10 | LCD DISPLAY | Displays the temperature level, Battery status, vial number and warnings if any. |
| 11 | POWER SWITCH | ON/OFF switch |
| 12 | CASING | It is the body of the device which holds all the components together (physical integrity) and also separates the cooling chamber from the surrounding |
| 13 | ELECTRONICS | Which includes all the electronic components like micro controller/ embedded system and PCB |
| 14 | BATTERY | Rechargeable battery which drives the whole device and its functionality. |
| 15 | TEMPERATURE SENSOR | Which senses the internal temperature |
| 16 | BUZZER | Which gives audible warning signal |
| 17 | HOT SIDE HEAT SINK | Which is exposed to the surrounding air for heat loss |
| 18 | COLD SIDE HEAT SINK | Which is exposed to the internal chamber to absorb the heat and transfer it to the other side |
| 19 | COLD SIDE/ INTERNAL FAN | Which helps to circulate the air inside |
| 20 | COLLAR | Which is used to hold the flask in place |
| 21 | RIVET | Which attaches the handle to the body |
| 22 | SKIRT | Which acts as an outer cover to the flask |
| 23 | POWER PLUG | Which provides electrical connection to the TEA |
| 24 | AIR DEFLECTOR | Air deflector ( bottom plate for air distribution) |
| 25 | WIRE SENSOR | Wire for vial position sensor |
| 26 | VIAL POSITION SENSOR | Vial position sensor under the vial |

FIG. 1

REFRIGERATION DEVICE

FIELD OF DISCLOSURE

The present disclosure relates to refrigeration devices. In particular, it relates to portable refrigeration devices.

BACKGROUND OF THE DISCLOSURE

The background description includes information that may be useful in understanding the present invention. It is not an admission that any of the information provided herein is prior art or relevant to the presently claimed invention, or that any publication specifically or implicitly referenced is prior art.

Many items need to be transported under controlled refrigeration conditions as they require strict temperature control. This need is most acute when lifesaving vaccines are being transported to various locations. Precise temperature conditions need to be maintained. If the temperature of these vaccines goes too high or drops below freezing it can permanently inactivate the vaccines thus rendering them useless in inoculation against disease and can in some circumstances make them unsafe for use.

World Health Organization stipulates that most vaccines are to be kept in a safe, cool range of 2 degrees to 8 degrees Celsius. While cooler boxes etc. are frequently used, particularly in emerging economies with poor cold chain for such transports, such boxes with no constant and reliable monitoring systems are highly unreliable and may be downright unsafe for such transports. A 2013 WHO study in India showed that around 75% of freeze-sensitive vaccines had been exposed to freezing by the time they made it through the supply chain.

While some refrigeration devices for such transportation of temperature sensitive items such as vaccines under controlled temperature conditions exist, they are very bulky and need large amounts of power.

There then remains a need for a self-contained, energy-economical, compact and portable refrigeration device for transporting items that require temperature control.

OBJECTS OF THE PRESENT DISCLOSURE

Some of the objects of the present disclosure, which at least one embodiment herein satisfies are as listed herein below.

It is an object of the present disclosure to provide for a refrigeration device that maintains accurate temperature of objects kept within.

It is an object of the present disclosure to provide for a refrigeration device that is easily portable.

SUMMARY

The present disclosure relates to refrigeration devices. In particular, it relates to a portable refrigeration device weighing less than 5 kilograms with ergonomic design and adaptable for use in transport of medicines, vaccines, food, beverages, dairy etc.

This summary is provided to introduce simplified concepts of a refrigeration which are further described below in the Detailed Description. This summary is not intended to identify key or essential features of the claimed subject matter, nor is it intended for use in determining/limiting the scope of the chimed subject matter.

In an aspect, present disclosure elaborates upon a refrigerating device that can include: a refrigeration mechanism; and a cooling chamber, wherein the cooling chamber can be operatively coupled to the refrigeration mechanism using any or a combination of a latching mechanism and a screwing mechanism, and can be configured to hold a load to be cooled.

In another aspect, the load can include at least one vial containing a fluid, the vial held in a space configured in the cooling chamber, wherein the space can be configured with a sensor to detect absence or presence of the at least one vial. In another aspect, sensor can be configured to detect the lid-closing ie. to determine if the threaded mechanism is fastened fully/appropriately (to ensure collar and flask are effectively sealed). This sensor may provide valuable data like the number of times the device is opened for content retrieval/deposit and the duration for which the device was left open. This may provide insights on the battery performance and user-behavior too.

In yet another aspect, the cooling chamber can have an absorbent means at its bottom to absorb any spillage of the fluid from the at least one vial.

In an aspect, the refrigeration mechanism can be a thermo-electric assembly (TEA).

In another aspect, the device can include a proportional integral derivative (PID) controller to set and regulate temperature inside the cooling chamber.

In yet another aspect, the cooling chamber can be a vacuum flask, open end of the vacuum flask configured to be thermally sealed with the TEA, wherein the vacuum flask can provide thermal insulation between the load and ambient environment.

In an aspect, the TEA can have a fan on its cold side heat sink, the fan configured to circulate air in the cooling chamber and over the load.

In another aspect, the vacuum flask can be thermally sealed with the TEA by configuring the TEA in a collar of thermal insulation, the collar configured to hold the vacuum flask by means of threads configured on the collar and the vacuum flask.

In yet another aspect, the vacuum flask can be configured to provide the thermal insulation using any or a combination of vacuum and thermal insulation material.

In an aspect, the device can be powered using at least one battery.

In another aspect, the device can be configured to have total operating weight less than 5 kilograms. In yet another aspect, the device can be configured to have total operating weight less than 8 kilograms.

In yet another aspect, the device can include a head cap configured to be attached on to the refrigeration mechanism, wherein upon attachment, power supply to the refrigeration mechanism can continence, and wherein the head cap can be designed for maximum thermal insulation to the cooling chamber.

In an aspect, the cooling chamber can have an air deflector at its bottom, the air deflector configured to guide air falling on it equally over the load from beneath the load.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein:

FIG. 1 illustrates a table of major components used in proposed device in accordance with an exemplary embodiment of the present disclosure.

FIG. 1 illustrates a list of parts that maybe used in a refrigeration device in accordance with an exemplary embodiment of the present disclosure.

FIG. 5A is a cut-section view that illustrates details affixing of head cap to vacuum flask of the proposed device and cold air flows formed within in accordance with an exemplary embodiment of the present disclosure, while

DETAILED DESCRIPTION

Figure 2:
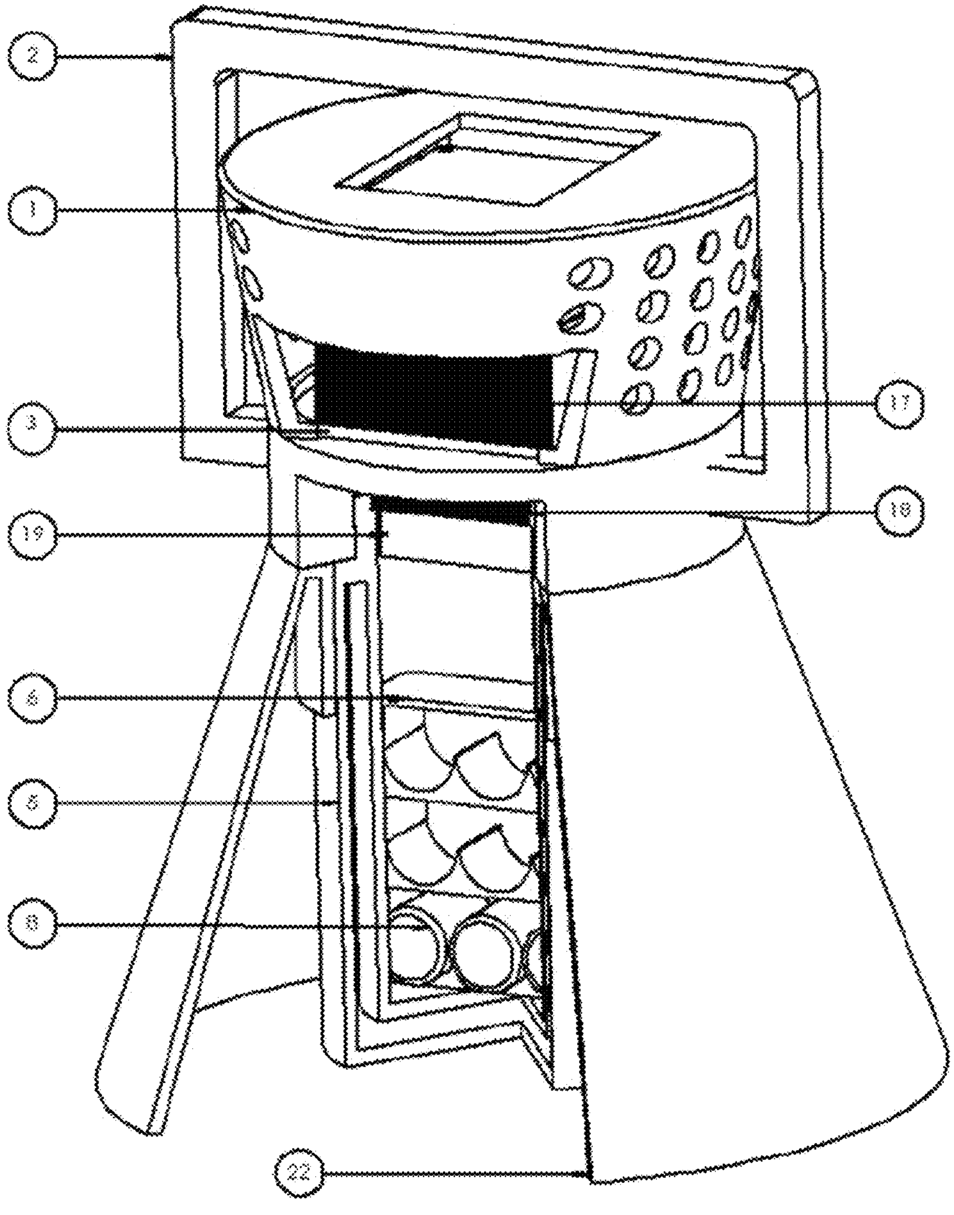
FIGS. 2 and 3 illustrate various components of the proposed device and their arrangement in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various parts/elements shown in the figures may be provided through the use of alternate parts similar in function and scope. Similarly, any switches shown in the figures/described are conceptual only. Their function may be carried out through the operation of program logic, through dedicated logic, through the interaction of program control and dedicated logic, or even manually, the particular technique being selectable by the entity implementing this invention.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Each of the appended claims defines a separate invention, which for infringement purposes is recognized as including equivalents to the various elements or limitations specified in the claims Depending on the context, all references below to the "invention" may in some cases refer to certain specific embodiments only. In other cases it will be recognized that references to the "invention" will refer to subject matter recited in one or more, but not necessarily all, of the claims.

The use of any and all examples, or exemplary language (e.g., "such as") provided with respect to certain embodiments herein is intended merely to better illuminate the invention and does not pose a limitation on the scope of the invention otherwise claimed No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

In an aspect, present disclosure elaborates upon a refrigerating device that can include: a refrigeration mechanism; and a cooling chamber, wherein the cooling chamber can be operatively coupled to the refrigeration mechanism using any or a combination of a latching mechanism and a screwing mechanism, and can be configured to hold a load to be cooled.

In another aspect, the load can include at least one vial containing a fluid, the vial held in a space configured in the cooling chamber, wherein the space can be configured with a sensor to detect absence or presence of the at least one vial. In another aspect, sensor can be configured to detect the lid-closing ie. to determine if the threaded mechanism is fastened fully/appropriately (to ensure collar and flask are effectively sealed). This sensor may provide valuable data like the number of times the device is opened for content retrieval/deposit and the duration for which the device was left open. This may provide insights on the battery performance and user-behavior too.

In yet another aspect, the cooling chamber can have an absorbent means at its bottom to absorb any spillage of the fluid from the at least one vial.

In an aspect, the refrigeration mechanism can be a thermo-electric assembly (TEA).

In another aspect, the device can include a proportional integral derivative (PID) controller to set and regulate temperature inside the cooling chamber.

In yet another aspect, the cooling chamber can be a vacuum flask, open end of the vacuum flask configured to be thermally sealed with the TEA, wherein the vacuum flask can provide thermal insulation between the load and ambient environment.

In an aspect, the TEA can have a fan on its cold side heat sink, the fan configured to circulate air in the cooling chamber and over the load.

In another aspect, the vacuum flask can be thermally sealed with the TEA by configuring the TEA in a collar of thermal insulation, the collar configured to hold the vacuum flask by means of threads configured on the collar and the vacuum flask. Alternatively, there can be a ring which is threaded and is attached (fixed) to the collar but free to rotate. This ring can be coupled/decoupled to flask as per requirement. This permits the collar not to have rotational motion and can hence be attached to a casing by use of a pivoting hinge. This hinge apart from providing support can also aid in routing wires through it for power-supply and signal to the TEA.

In yet another aspect, the vacuum flask can be configured to provide the thermal insulation using any or a combination of vacuum and thermal insulation material.

In an aspect, the device can be powered using at least one swappable battery.

In another aspect, the device can be configured to have total operating weight less than 5 kilograms. In yet another aspect, the device can be configured to have total operating weight less than 8 kilograms.

In yet another aspect, the device can include a head cap configured to be attached on to the refrigeration mechanism, wherein upon the attachment power supply to the refrigeration mechanism can commence, and wherein the head cap can be designed for maximum thermal insulation to the cooling chamber.

In an aspect, the cooling chamber can have an air deflector at its bottom, the air deflector configured to guide air falling on it equally over the load from beneath the load.

Figure 3:
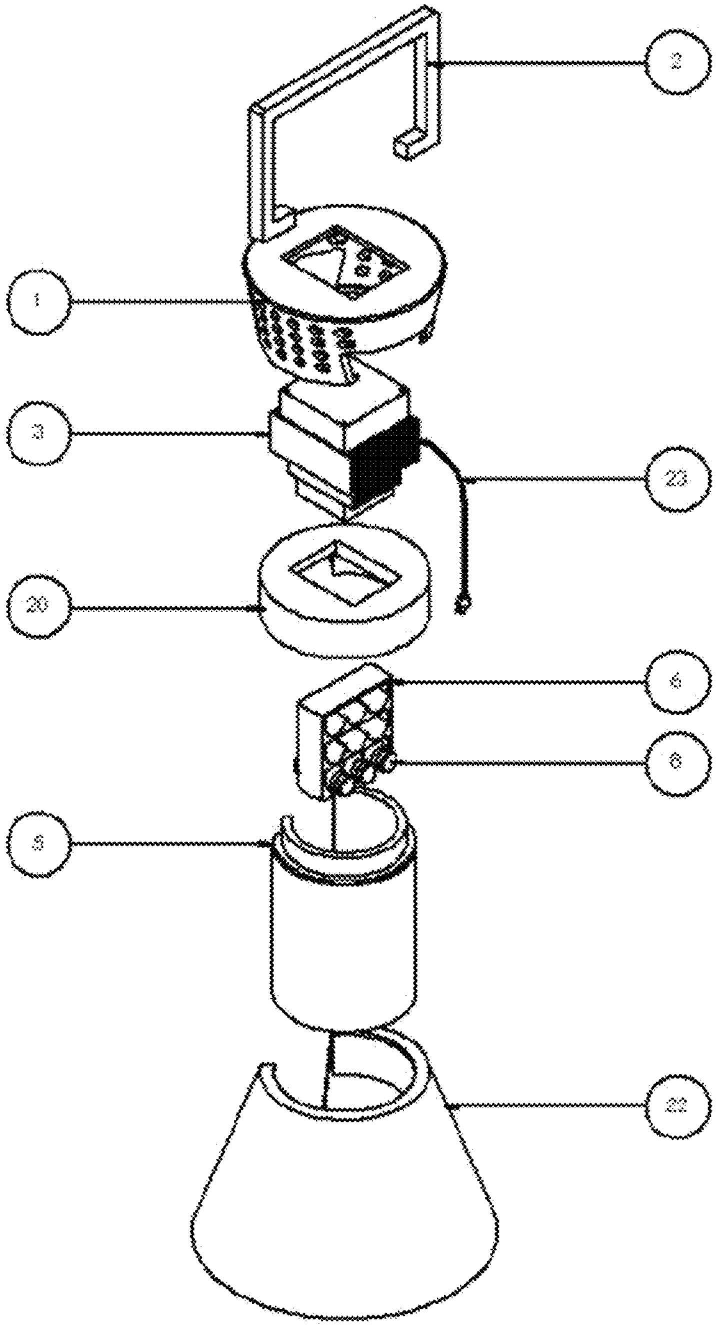

FIGS. 2 and 3 illustrate various components of the proposed device and their arrangement in accordance with an exemplary embodiment of the present disclosure.

In an aspect, the device can consist of a head cap (1) with a small foldable handle (2) on top, as shown in FIG. 2. Head cap (1) can be of a geometry optimized for maximum insulation around a thermo-electric assembly (TEA) (3) it can hold as further described. Head cap (1) can be made of appropriate thermoplastic material.

As known, a TEA serves to extract heat from one of its side (thereby making that side a cold side, interchangeably termed as a cold side heat sink herein) to another (thereby making the other side as a hot side, interchangeably termed as hot side heat sink herein). Both cold side heat sink and hot side heat sink can be configured with fans. Fan on the cold side heat sink can pass air over the cold side heat sink and pass on the cooled air to a cooling chamber to cool contents therein. Fan on the hot side heat sink can pass air over the hot side and throw the heated air to external atmosphere. Heat exchange fins can be configure on both sides for easy transference of heat as required.

The cold side heat sink (illustrated as element 18 in figures attached) can be configured to have a holder (6) operatively held to it that can hold contents needing to be refrigerated. In an exemplary embodiment, the holder (6) can be cuboidal and can be configured to hold load (8) that may be vials needing cooling to a precise temperature. Holder (6) can be made of any suitable material (such as acrylic, polypropylene or any other suitable) that does not affect the refrigeration characteristics of the device. As can be readily understood, holder (6) may not be needed and the load (8) can be held directly in a vacuum flask (5) as elaborated further. Vacuum flask (5) can as well be termed as a cooling chamber as it serves to cool load (8), as further laborated.

Figure 4:
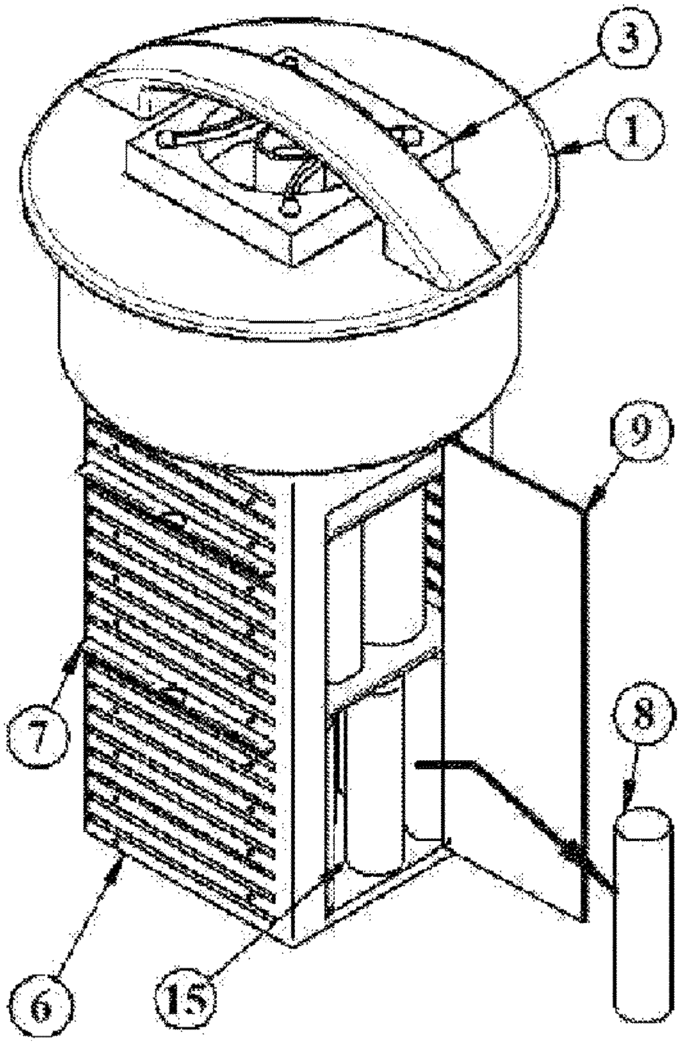
FIG. 4 is a orthogonal projection of the contents to be refrigerated in the proposed refrigeration device in accordance with an exemplary embodiment of the present disclosure.

Load (8) can be any appropriate thermally sensitive material that requires refrigeration or is to be maintained at any temperature preset by the user. The load (8) can be protected by a small door (9) as shown in FIG. 4 to facilitate easy retrieval of the contents by the user Various components of the proposed device can be held enclosed in a skirt (22) with only the head cap (1) and handle (2) external. This geometry gives a low center of gravity for the device and provides ergonomic support while transporting proposed device or removing contents within (such as vacuum flask (5) further elaborated).

The vacuum flask/cooling chamber (5) may be configured so as to be thermally insulated against ambient environment. For instance, vacuum flask (5) may be a stainless steel container with double walls with thermal insulation/vacuum and may be configured to be screwed by means of helical threads to a bracket/collar made of thermal insulation such as polyurethane, the collar also configured to hold TEA (3) as further described. Configured in such a manner, vacuum flask (5) can provide a cylindrical boundary (with one face covered) that can act as an insulating separation between ambient environment and the load (8) held in holder (6), wherein the load (8) needs to be refrigerated. As already said, load (8) may be directly held in vacuum flask (5) itself, using appropriate holders.

Alternatively, there can be a ring which is threaded and is attached (fixed) to the collar but free to rotate. This ring can be coupled/decoupled to flask as per requirement. This permits the collar not to have rotational motion and can hence be attached to the casing (13) by use of a pivoting hinge. This hinge apart from providing support can also aid in routing wires through it for power-supply and signal to the TEA.

A temperature sensor (15) as shown in FIG. 4 can be configured in holder (6) to provide necessary control signals to a control system configured to automatically operate the TEA (3) as required. Electric power to the TEA (3) can be provided via a manual switch.

Figure 5A:
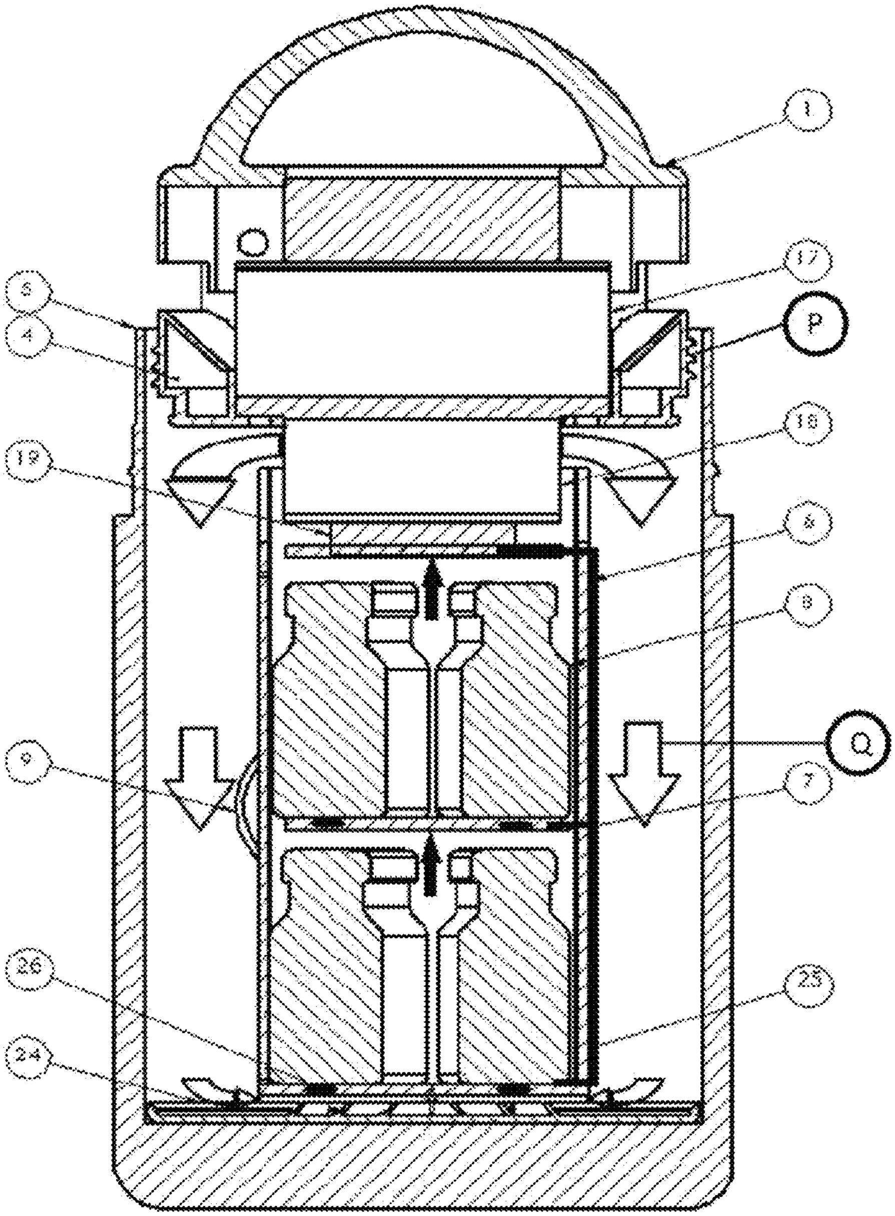

FIG. 5A depicts a cut-section view of a cooling chamber (5) of the proposed device coupled to head cap (1). The head cap (1) also serves as a thermal barrier around the TEA (3) with an objective of minimizing heat entry into vacuum flask (5). Profile of the head cap (1) can be designed to maximize the insulation between hot and cold sides of the thermo-electric assembly (TEA) (3) and also ensure that there is no encumbrance to air-flows to and from both fans (for hot side heat sink and cold side heat sink) on the TEA (3). The holder (6) can hold vials (8) to be cooled and can receive a flow of cold air from TEA (3) as further elaborated.

Figure 5B:
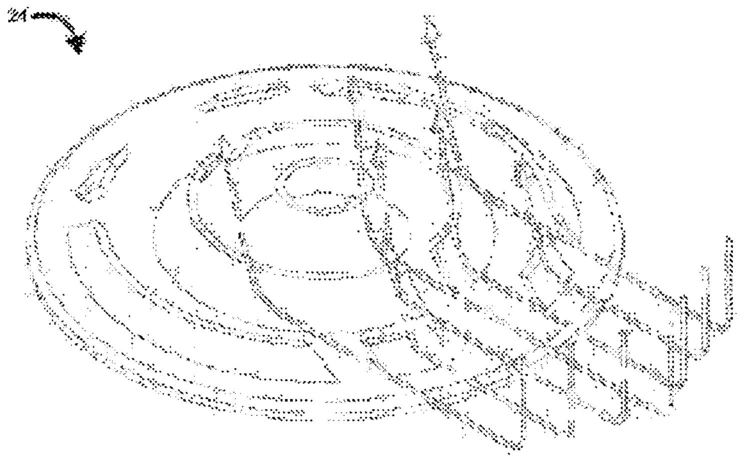
FIG. 5B illustrates an air deflector that can be used to guide the air flows in accordance with an exemplary embodiment of the present disclosure.

FIG. 5A illustrates details affixing of head cap to vacuum flask of the proposed device and cold air flows formed within in accordance with an exemplary embodiment of the present disclosure, while FIG. 5B illustrates an air deflector that can be used to guide the air flows in accordance with an exemplary embodiment of the present disclosure The head cap (1) can have voids that are filled with expandable foam for superior insulation, for instance Polyurethane foam (4) as showing in FIG. 5A. Between hot side of TEA (3) and head cap (1) appropriate thermal insulation can be provided to prevent direct conduction of heat onto head cap (1) and subsequently into the holder (6) surrounded by vacuum flask/cooling chamber (5). Besides the cold-side heat sink (as shown at element 18 in FIG. 2 and FIG. 5A), the head cap (1) can have a thick (20 mm) thick foam made of, for instance, ethylene-vinyl acetate or any appropriate insulating material for cool-retention inside the cooling chamber.

The head cap (1) can be configured to hold TEA (3) in such a manner that hot side heat sink (17) is held in the head cap (1) in a collar made of (or filled with) thermal insulation (4), the collar having threads (shown as P in FIG. 5A) around its periphery. Vacuum flask (5) can be provided with corresponding threads on its open end to enable it to be screwed onto the collar and thus held with head cap (1), while cold side heat sink can provide cooing to space in the vacuum flask (5). The space can hold holder (6). Vacuum flask (5) can be vacuum insulated and hence, in this manner, can act as a thermal barrier between the holder (6) and the ambient environment. A rubber washer can be used while vacuum flask (5) is being screwed onto the head cap (1) to provide for air-tightness. The head cap (1) can have provisions for providing power to TEA using an appropriately configured switch FIG. 5A illustrates the cold-air pathways that can be formed in device disclosed to cool vial holder (6) and contents (8) within Vacuum flask (5) enclosing the vial holder (6) in a thermally sealed manner can provide vacuum barriers between holder (6)/load (8) and ambient (external) environment A fan in the cold side heat sink can circulate cold air over the holder (6) and over the load/vials (8) held in vial tray (7) as shown so as to provide continuous cooling to the load (8) as required.

The refrigeration device proposed can be configured to maintain load (8) at a constant set temperature so that even the slightest variation from a preset temperature can start the TEA (3). In an exemplary embodiment, a constant set temperature with a maximum permissible variance of +/−1 degree Celsius can be achieved in the space enclosed by vacuum flask/cooling chamber (5).

As can be readily appreciated, a variance in temperature maybe result of intentional interference by an external force. For instance, vacuum flask (5) maybe unscrewed/removed from the TEA (3). Heat may flow from ambient atmosphere to the holder (6) raising its temperature. As soon as temperature rises above a pre-set point, the control system may signal the TEA (3) to start. Fan configured in cold side heat sink (18) may start and circulate cold air over holder (6) and over load (8) as shown by air streams indicated as (Q). Consequently the load (8) can get cooled to the set temperature again when the TEA (3) may be commanded by the control system to shut down again. Temperature sensor (15) as shown in FIG. 5A may provide necessary inputs to the control system.

In an exemplary embodiment, air as shown in airstreams Q may be continuously circulated while the TEA (3) can be switched on or off by the control system to keep load (8) in the cooling chamber (5) at a fixed temperature set using the control system. The constant current of air as shown by airstreams Q can ensure there are no hotspots inside the cooling chamber (5) and constant temperature is maintained throughout the chamber (5), and accordingly, in the items contained therein.

Control system used in proposed device can be of a Proportional-Integral-Derivative (PID) type to maintain appropriate voltage for the TEA (3) as per the temperature fluctuations noted inside the cooling chamber (5). Control loop feedback mechanism enabled by the PID control system can modulate the temperature of the cold side heat sink (18) and speed of the cold side/internal fan (19), thus cooling the load (8).

In an exemplary embodiment, the viability of samples stored inside the cold chamber can be determined by the control system, preferably by software of the control system. The number of times there is a temperature excursion beyond safe (permissible) limits is monitored (by use of a lid-closing sensor) and even the duration for which the temperature excursion is noted by the system. This may be correlated against data fed by a user on acceptable temperature excursions and thus the system will determine if the samples stored is still viable for use. For example, if vaccines are stored inside the chamber and a user has to retrieve the samples repeatedly and every time the device is opened (human-interference), this leads to freeze-thaw cycles. This repeated heating and cooling is not desirable for vaccines and there are studies to indicate the acceptable number of these cycles. These obtained values/parameters can be manually fed into proposed refrigerating device and if it exceeds the pre-set limit, the device provides an alarm in the form of visual (lights) or auditory (beeps) indicating that samples are degraded and unfit for use.

In an exemplary embodiment, the cold side heat sink (18) can be configured with heat exchange fins towards the cooling chamber side. Air drawn by fan (19) from cooling chamber/(5) can pass over the heat exchange fins and, if the TEA (3) is operating, get cooled while transferring its heat to the heat exchange fins. TEA (3) can transfer heat so received to its hot side heat sink (17) where it can be dissipated to the atmosphere, using, for example, a fan that maybe configured on the hot side heat sink (17). The cold air in the cooling chamber (5) can circulate over load (8), as illustrated by airstream Q in FIG. 5A, thereby cooling the load.

A portable embodiment of the device may consist of an automated connector ie. a spring loaded electrical contact point, which forms a series-type connection between the TEA and the rest of the electrical circuit upon successful fastening (attachment) of the head cap (1) to the TEA by means of appropriate threading in the head cap and the TEA.

As said, proposed refrigerating device can be used to hold a plurality of vials (that can be considered as load (8) held in vial-tray (7). Each pocket/space in the vial tray can be configured with a sensor (26). Sensor 26 can be a force-sensitive film and can indicate the presence of a small load (vaccine vials, small liquid containers). Signals from the sensors 26 can be provided via wires (25) and cap (1) to an external inventory management system. In this manner, amount of vials of vaccines held in the refrigerating device can be closely monitored and the vials can be replenished when required. In another aspect, sensor can be configured to detect the lid-closing ie. to determine if the threaded mechanism is fastened fully/appropriately (to ensure collar and flask are effectively sealed). This sensor may provide valuable data like the number of times the device is opened for content retrieval/deposit and the duration for which the device was left open. This may provide insights on the battery performance and user-behavior too.

Since the small-volume vials are generally glass with liquid contents, there is a chance of their breakage and hence leakage of fluids contained within. To facilitate easy cleansing and sterilizing of the cooling chamber (5), it can have absorbent means at its bottom to absorb any spillage of such fluids from the vials. In an exemplary embodiment, such absorbent means can be a thin circular pad. This can be stitched cotton or Super-Absorbent Polymers (SAP) used in sanitary napkins.

As elaborated, airstreams Q can ensure there are no hotspots inside the cooling chamber (5) and constant temperature is maintained throughout it and accordingly, in the items (such as vials holding vaccines) contained therein. As the cold air falls down, it traverses around load (8) (vials) held in vial tray (7) held in vial holder (6), thereby cooling the vials. As it gets warmed up, it rises naturally thereby further cooling the vials.

In this manner, proposed device efficiently blankets contents in the cooling chamber with cold air to achiever achieve uniform and precise temperature throughout the cooling chamber Since the device is ideally suited to small volumes such as vials holding vaccines, micro-refrigeration of contents therein can be achieved.

To facilitate upward travel of the airstream, bottom portion of the cooling chamber (5) or vial tray can have an air deflector shown as item (24) in FIG. 5A, further elaborated in FIG. 5B.

Air deflector (24) can guide the air from the lower parts of the cold-chamber (5) into the vial tray (7) from beneath it. The aerodynamic profile of the air deflector (24) can be such that the air flowing downwards from the cold-side heat sink (18) can be equally distributed across the cross-section of the vial-tray as it rises above. This can ensure that all of load (8) such as the vials of vaccine have cold air passing through them (to blanket them), for maximum efficiency in heat transfer. The air deflector (24) can also serve as a support for the vial-tray (7) when it is detached from the cold chamber and placed on ground.

Figure 6:
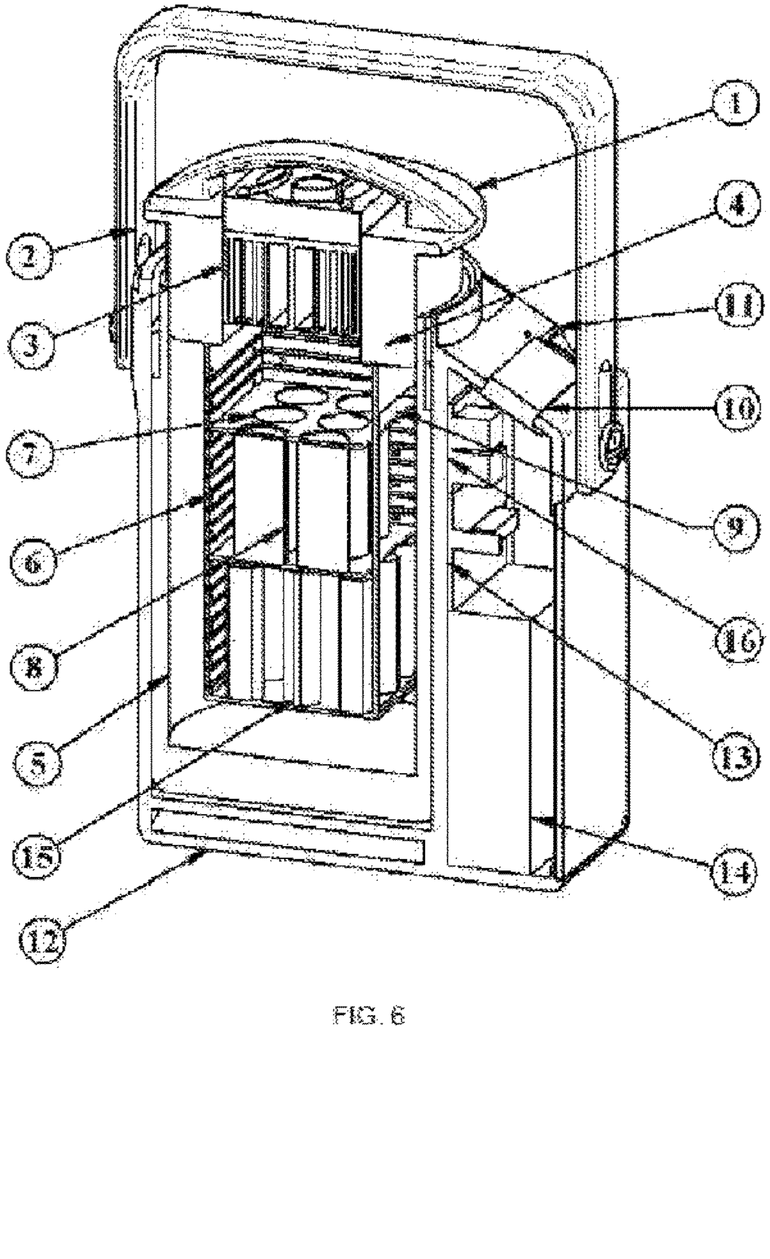
FIGS. 6 and 7 illustrate an exemplary embodiment of the proposed device in accordance with an exemplary embodiment of the present disclosure.
Figure 7:
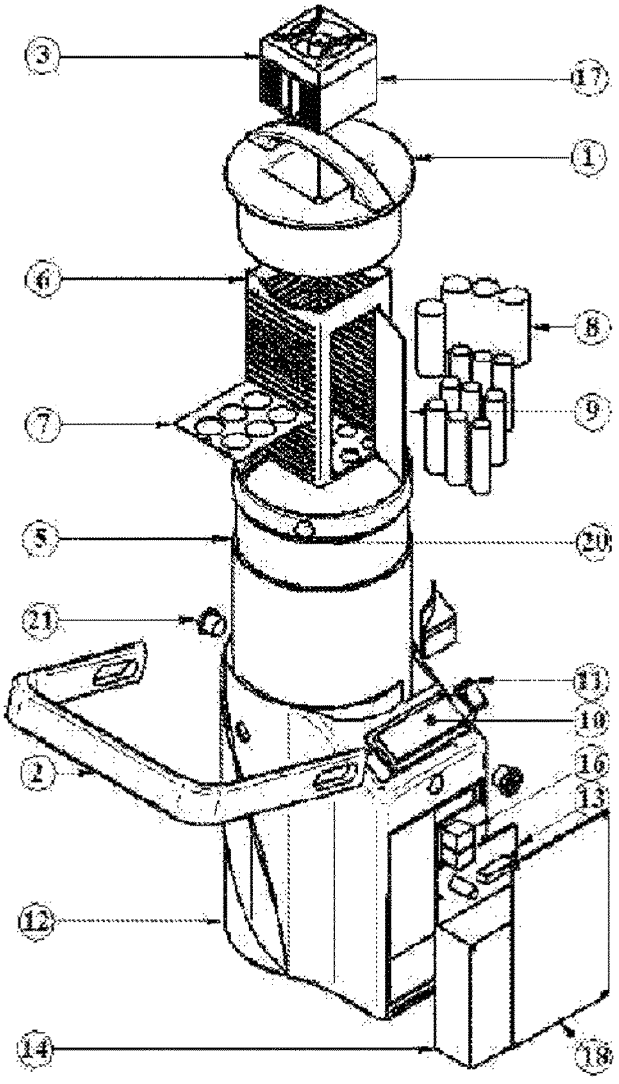

FIGS. 6 and 7 illustrate an exemplary embodiment of the proposed device in accordance with an exemplary embodiment of the present disclosure.

FIGS. 6 and 7 illustrate a portable refrigeration device using concepts and construction features elaborated herein. Casing (12) holds all of the components together in an ergonomic manner to enable a user to move the device easily even when it is working. The device functions as an independent system that requires no external power-source due to use of a battery pack (14). By configuring volume and weight of various components, the device can be configured to weigh less than 5 kilograms, thus enabling very easy portability. In another aspect, example, the device can be configured to have total operating weight less than 8 kilograms.

In an exemplary embodiment, the battery pack is swappable.

In this manner, present disclosure elaborates upon a refrigerating device wherein a rigid vacuum flask forming a cooling chamber is sleeved onto a thermo-electric assembly by a latching mechanism or a helical screw. A Proportional Integral Derivative (PID) controller sets and regulates the temperature inside the vacuum flask, the vacuum flask holding items (for instance vaccine vials) to be held in a controlled temperature environment. The device can be self-contained with batteries for its operation and can be configured as a portable refrigeration device weighing less than 5 kilograms and with an ergonomic design.

Although the description above contains much specificity, these should not be construed as limiting the scope of the invention, but as merely providing illustrations of some of the presently preferred embodiments of this invention. Thus the scope of the invention should be determined by the appended claims and their legal equivalents.

While the proposed device has been elaborated as above to include all the main parts, it is completely possible that actual implementations may include only a part of the proposed parts or a combination of those or a division of those into sub-parts. Therefore, all possible modifications, implementations and embodiments of where and how the proposed device is configured are well within the scope of the present invention.

As used herein, and unless the context dictates otherwise, the term "coupled to" is intended to include both direct coupling (in which two elements that are coupled to each other or in contact with each other) and indirect coupling (in which at least one additional element is located between the two elements). Therefore, the terms "coupled to" and "coupled with" are used synonymously.

In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

ADVANTAGES OF THE INVENTION

The present disclosure provides for a refrigeration device that maintains accurate temperature of objects kept within.

The present disclosure provides for a refrigeration device that is easily portable and can weigh less than 5 kilograms.

We claim:

1. A refrigerating device comprising:

a refrigeration mechanism comprising a cold side heat sink, configured to circulate air downwards from the cold side heat sink; and a cooling chamber, wherein the cooling chamber is operatively coupled to the refrigeration mechanism using a screwing mechanism, and is configured to hold a load to be cooled in a tray, and wherein the screwing mechanism thermally seals the refrigeration mechanism with the cooling chamber for effective cooling of the load; and wherein said cooling chamber has an air deflector at a bottom of the cooling chamber, said air deflector configured to distribute the air falling downwards from the cold side heat sink on said air deflector equally across a cross-section of the tray from beneath said load.

2. The refrigerating device of claim 1, wherein said load comprises at least one vial containing a fluid, said vial held in the tray configured in said cooling chamber, and wherein said tray is configured with a sensor to detect absence or presence of said at least one vial.

3. The refrigerating device of claim 2, wherein said cooling chamber has a stitched cotton or super-absorbent polymers (SAP) at the bottom of the cooling chamber to absorb any spillage of said fluid from said at least one vial.

4. The refrigerating device of claim 1, wherein the refrigeration mechanism is a thermo-electric assembly (TEA).

5. The refrigerating device of claim 4, wherein said cooling chamber is a vacuum flask, open end of said vacuum flask configured to be thermally sealed with said TEA, wherein said vacuum flask provides thermal insulation between said load and ambient environment.

6. The refrigerating device of claim 5, wherein said vacuum flask is thermally sealed with said TEA by configuring the TEA in a collar of thermal insulation, the collar configured to hold to said vacuum flask by means of helical screw threads, wherein the helical screw threads are configured on said collar and on said vacuum flask so as to interact with each other to form the screwing mechanism.

7. The refrigerating device of claim 5, wherein said vacuum flask is thermally sealed with said TEA by configuring the TEA in a collar of thermal insulation, the collar configured to hold to said vacuum flask by means of helical screw threads.

8. The refrigerating device of claim 5, wherein said vacuum flask is configured to provide said thermal insulation using any or a combination of vacuum and thermal insulation material.

9. The refrigerating device of claim 8, wherein said refrigerating device is powered using at least one swappable battery.

10. The refrigerating device of claim 4, wherein said TEA has a fan on the cold side heat sink of the TEA, said fan configured to circulate the air in said cooling chamber and over said load.

11. The refrigerating device of claim 1, wherein the device comprises a proportional integral derivative (PID) controller to set and regulate temperature inside said cooling chamber.

12. The refrigerating device of claim 1, wherein said refrigerating device is configured to have total operating weight less than 5 kilograms.

13. The refrigerating device of claim 1, wherein said device comprises a head cap configured to be attached on to said refrigeration mechanism, wherein upon an attachment power supplied to said refrigeration mechanism commences, and wherein said head cap is designed for maximum thermal insulation to said cooling chamber.

14. A refrigerating device, the said refrigerating device characterized in that comprising:

a refrigeration mechanism (3) comprising a cold side heat sink, configured to circulate air downwards from the cold side heat sink; and a cooling chamber (5), wherein the cooling chamber (5) is operatively coupled to the refrigeration mechanism (3) using a screwing mechanism, and is configured to hold a load (8) to be cooled in a tray, wherein the screwing mechanism thermally seals the refrigeration mechanism with the cooling chamber for effective cooling of the load; and wherein said cooling chamber has an air deflector at a bottom of the cooling chamber, said air deflector configured to distribute the air falling downwards from the cold side heat sink on said air deflector equally across a cross-section of the tray from beneath said load, wherein the device includes a proportional integral derivative (PID) controller to set and regulate temperature inside the cooling chamber (5), and wherein the refrigerating device is configured to have total operating weight of less than 5 kilograms.

15. A refrigerating device, the said refrigerating device characterized in that comprising:

a refrigeration mechanism (3) comprising a cold side heat sink, configured to circulate air downwards from the cold side heat sink; and a cooling chamber (5), wherein the cooling chamber (5) is operatively coupled to the refrigeration mechanism (3) using a screwing mechanism, and is configured to hold a load (8) to be cooled in a tray, wherein the screwing mechanism thermally seals the refrigeration mechanism with the cooling chamber for effective cooling of the load; and wherein said cooling chamber has an air deflector at a bottom of the cooling chamber, said air deflector configured to distribute the air falling downwards from the cold side heat sink on said air deflector equally across a cross-section of the tray from beneath said load, wherein the device includes a proportional integral derivative (PID) controller to set and regulate temperature inside the cooling chamber (5), and wherein the refrigerating device is configured to have total operating weight of less than 8 kilograms.

* * * * *